US008190801B2

(12) United States Patent
Harris et al.

(10) Patent No.: US 8,190,801 B2
(45) Date of Patent: May 29, 2012

(54) INTERCONNECT LOGIC FOR A DATA PROCESSING APPARATUS

(75) Inventors: Antony John Harris, Sheffield (GB); Bruce James Mathewson, Cambridgeshire (GB)

(73) Assignee: ARM Limited, Cambridge (GB)

( * ) Notice: Subject to any disclaimer, the term of this patent is extended or adjusted under 35 U.S.C. 154(b) by 754 days.

(21) Appl. No.: 11/440,056

(22) Filed: May 25, 2006

(65) Prior Publication Data

US 2006/0271715 A1 Nov. 30, 2006

(30) Foreign Application Priority Data

May 26, 2005 (GB) .................................. 0510796.6

(51) Int. Cl.
*G06F 13/362* (2006.01)
*G06F 13/14* (2006.01)

(52) U.S. Cl. ........................................ 710/113; 710/241

(58) Field of Classification Search .................. 710/110, 710/107, 113, 240, 241
See application file for complete search history.

(56) References Cited

U.S. PATENT DOCUMENTS

| | | | | |
|---|---|---|---|---|
| 5,345,562 | A | 9/1994 | Chen | |
| 5,949,981 | A | 9/1999 | Childers | |
| 6,230,219 | B1 * | 5/2001 | Fields et al. | 710/22 |
| 6,240,479 | B1 | 5/2001 | Snyder et al. | |
| 6,493,776 | B1 | 12/2002 | Courtright et al. | |
| 6,651,148 | B2 * | 11/2003 | Widdup | 711/158 |
| 6,687,821 | B1 * | 2/2004 | Hady et al. | 713/100 |
| 6,728,816 | B1 | 4/2004 | Worrell | |
| 7,054,969 | B1 * | 5/2006 | Phelps et al. | 710/113 |
| 7,072,817 | B1 * | 7/2006 | Carey | 703/14 |
| 2004/0049620 | A1 * | 3/2004 | Rowlands et al. | 710/107 |

(Continued)

FOREIGN PATENT DOCUMENTS

JP 2000 285068 10/2000

(Continued)

OTHER PUBLICATIONS

UK Search Report for GB0510796.6 dated Aug. 31, 2005.

(Continued)

*Primary Examiner* — Mark Rinehart
*Assistant Examiner* — Nimesh G Patel
(74) *Attorney, Agent, or Firm* — Nixon & Vanderhye P.C.

(57) ABSTRACT

Interconnect logic is provided for coupling master logic units and slave logic units within a data processing apparatus to enable transactions to be performed. Each transaction comprises an address transfer from a master logic unit to a slave logic unit and one or more data transfers between that master logic unit and that slave logic unit. The interconnect logic comprises a plurality of connection paths for providing at least one address channel for carrying address transfers and at least one data channel for carrying data transfers, and control logic is used to control the use of the at least one address channel and the at least one data channel in order to enable the transactions to be performed. The control logic comprises address arbiter logic which, for an associated address channel, arbitrates between multiple address transfers seeking to use that associated address channel, and data arbiter logic which, for an associated data channel, arbitrates between multiple data transfers seeking to use that associated data channel. The data arbiter is operable independently of the address arbiter such that the data transfers of multiple transactions can occur out of order with respect to the corresponding address transfers of those multiple transactions. This enables efficient use to be made of the interconnect logic resources.

15 Claims, 5 Drawing Sheets

U.S. PATENT DOCUMENTS

2004/0199692 A1 10/2004 Phelps et al.
2005/0172060 A1* 8/2005 Rowlands et al. ............ 710/240

FOREIGN PATENT DOCUMENTS

JP 2002 041448 2/2002
JP 2002 278922 9/2002

OTHER PUBLICATIONS

Co-pending U.S. Appl. No. 10/743,537, filed Dec. 23, 2003.

USPTO, Official Action dated Mar. 2006 in U.S. Appl. No. 09/948,159.

Silicore Corporation, WISHBONE System-on-Chip (SoC) Interonnection Architecture for Portable IP Cores, Rev. B.2, Oct. 2001, pp. 1-109.

Silicore Corporation, "VME64 to PCI Bridge System-on-Chip (SoC)" Technical Reference Manual, 2002, pp. 1-129.

VMEPCIBRc.vhd, a synthesizable VHDL source code file representing the VME64 to PCI Bridge System-on-Chip (SoC), Jan. 2004, pp. 132.

SEMABUFc.vhd, a synthesizable VHDL source code file representing the SEMABUF Entity used in the VME64 to PCI Bridge System-on-Chip(SoC), Jan. 2004, pp. 1-6.

VPWWRAPc.vhd, a synthesizable VHDL source code file representing the VPWWRAP Entity used in the VME64 to PCI Bridge System-on-Chip (SoC), Jan. 2004, pp. 1-7.

Translation of Japanese official action, mailed Sep. 10, 2010, in corresponding Japanese Application No. 2006-144856.

Partial translation of Japanese Application No. JP-A-2002-041448 published Feb. 8, 2002.

* cited by examiner

INTERCONNECT LOGIC FOR A DATA PROCESSING APPARATUS

FIELD OF THE INVENTION

The present invention relates to interconnect logic for a data processing apparatus, and in particular to techniques for performing transactions between master logic units and slave logic units coupled to the interconnect logic.

BACKGROUND

Within a data processing apparatus having a plurality of master logic units and slave logic units, it is known to provide interconnect logic for coupling the master logic units and the slave logic units to enable transactions to be performed. Each transaction consists of an address transfer from a master logic unit to a slave logic unit, and one or more data transfers between that master logic unit and that slave logic unit. For a write transaction these data transfers will pass from the master logic unit to the slave logic unit (in some implementations there will additionally be a write response transfer from the slave logic unit to the master logic unit), whilst for a read transaction these data transfers will pass from the slave logic unit to the master logic unit.

The interconnect logic will provide a plurality of connection paths for coupling the various master logic units and slave logic units. The way in which the various transfers are routed via those connection paths will be dependent on the bus protocol employed within the interconnect logic. One known type of bus protocol is the non-split transaction protocol, such as is employed within a data processing apparatus having an AHB bus designed in accordance with the AHB bus protocol developed by ARM Limited, Cambridge, United Kingdom. In accordance with such a non-split transaction protocol, there is a fixed timing relationship between the address transfer of a transaction and the subsequent one or more data transfers of that transaction. In particular, the data transfer starts in the cycle following that in which the address is transferred. Within such a design, it is known to provide an address arbiter to arbitrate between multiple address transfers seeking to use a particular connection path. Due to the fixed timing relationship between the address transfers and data transfers, then it will be appreciated that the data transfers of multiple transactions occur in the same order as the arbitrated address transfers.

As interconnect logic increases in complexity, due to the need to support the interconnection of a larger number of master and slave logic units, then another type of bus protocol has been developed known as a split transaction protocol. In accordance with such a split transaction protocol, the plurality of connection paths within the interconnect logic provide at least one address channel for carrying address transfers and at least one data channel for carrying data transfers. An example of such a split transaction protocol is the AXI (Advanced extensible Interface) protocol developed by ARM Limited, Cambridge, United Kingdom. The AXI protocol provides a number of channels over which information and data can be transferred, these channels comprising a read address channel for carrying address transfers of read transactions, a write address channel for carrying address transfers of write transactions, a write data channel for carrying data transfers of write transactions, a read data channel for carrying data transfers of read transactions, and a write response channel for returning transaction status information to the master logic unit at the end of a write transaction, such transaction status information indicating for example whether the transaction completed successfully, or whether an error occurred, etc. Use of such a split transaction protocol can increase the performance of a system compared with a similar system using a non-split transaction protocol.

Conventionally, when adopting such a split transaction protocol, data transfers over a data channel are prioritised according to the temporal ordering of the corresponding address transfers over the relevant address channel, such that data pertaining to earlier addresses (i.e. addresses transferred earlier over the address channel) are given priority over data pertaining to later addresses. This approach models closely the situation occurring in a non-split transaction protocol where the address and data are tightly coupled, and results in a balanced service to every master and slave logic unit coupled to the interconnect logic. However, such an approach does not make the most efficient use of the interconnect logic, and it is often the case that master devices will be stalled whilst waiting for the data transfers of particular transactions to take place.

An enhancement that may be used to allow some local re-ordering of transactions at a particular slave logic unit when using interconnect logic conforming to such a split transaction protocol is described in U.S. patent application Ser. No. 10/743,537 filed on 23 Dec. 2003, now U.S. Pat. No. 7,181.556, for which ARM Limited is the assignee. In accordance with the teaching of this application, each address transfer includes a source identifier identifying the source of the transaction. Preferably, each master logic unit has a plurality of possible source identifiers that can be associated with transactions that it issues. This has the advantage that, for example, transactions generated by different applications running on the same processor can be distinguished so that transaction sequences from each application can be independently ordered in cases where the processes themselves are independent of each other. A slave device can then perform some local reordering of pending transactions it has to service based on such source identifier information, such that, for example, the one or more data transfers associated with a transaction issued with a particular source identifier can be given priority over the one or more data transfers associated with an earlier pending transaction issued with a different, lower priority, source identifier.

However, whilst such an approach enables some local reordering at particular peripheral slave devices, it still suffers from the problem of not making the most efficient use of the interconnect logic, and accordingly can still give rise to situations where master logic units are stalled pending completion of the data transfers of particular transactions.

In the unconnected technical field of network-on-chip designs, it is known to allow particular nodes in the network to reorder read data packets based on a concept of priority.

It would be desirable to provide an improved technique for handling transactions within the interconnect logic of a data processing apparatus so as to make more efficient use of the resources of the interconnect logic in situations where a split transaction protocol is being used.

SUMMARY

Viewed from a first aspect, the present invention provides interconnect logic for coupling master logic units and slave logic units within a data processing apparatus to enable transactions to be performed, each transaction comprising an address transfer from a master logic unit to a slave logic unit and one or more data transfers between that master logic unit and that slave logic unit, the interconnect logic comprising: a plurality of connection paths operable to provide at least one address channel for carrying address transfers, at least one read data channel for carrying data transfers of read transactions from said slave logic units to said master logic units, and at least one write data channel for carrying data transfers of write transactions from said master logic units to said slave logic units; and control logic operable to control the use of the at least one address channel, the at least one read data channel and the at least one write data channel in order to enable the transactions to be performed; the control logic comprising: address arbiter logic operable for an associated address channel to arbitrate between multiple address transfers seeking to use that associated address channel; read data arbiter logic operable for an associated read data channel to arbitrate between multiple data transfers seeking to use that associated read data channel; and write data arbiter logic operable for an associated write data channel to arbitrate between multiple data transfers seeking to use that associated write data channel; each of the read data arbiter logic and write data arbiter logic being operable independently of the address arbiter logic such that the one or more data transfers of multiple transactions can occur out of order with respect to the corresponding address transfers of those multiple transactions.

In accordance with the present invention the control logic used to control the use of the at least one address channel, the at least one read data channel and the at least one write data channel provided by the connection paths of the interconnect logic comprises address arbiter logic, read data arbiter logic and write data arbiter logic. Each data arbiter logic is operable independently of the address arbiter logic such that when a data arbiter logic is arbitrating between data transfers seeking to use an associated data channel, it can allow the data transfers of multiple transactions to occur out of order with respect to the corresponding address transfers of those multiple transactions. Accordingly, the present invention enables independent data arbitration to be applied at a system level within the interconnect logic to thereby enable efficient use to be made of the resources of the interconnect logic. In particular, such an approach can be used to reduce the latency, or increase the throughput, of a particular slave logic unit or master logic unit.

Hence, such an approach may be used to allow devices with specific latency or bandwidth requirements to be prioritised over others, thereby helping to facilitate a Quality of Service (QoS) guarantee at a system level. This is becoming a key requirement of System on Chip (SoC) designs that have peripheral devices with specific latency and bandwidth requirements. Applying effective QoS guarantees also enables more efficient use to be made of the interconnect resources, which reduces the power and layout overhead of the interconnect logic.

Each data arbiter logic can be arranged to operate in a variety of ways. However, in one embodiment, the control logic further comprises: state logic operable to store state information derived from address transfers; each of the read data arbiter logic and write data arbiter logic being independently operable to reference the state information in order to determine which of the multiple data transfers seeking to use the associated data channel are legal arbitration targets; each of the read data arbiter logic and write data arbiter logic being independently operable in the presence of multiple legal arbitration targets to apply an arbitration policy to grant access to the associated data channel to one of the data transfers that is a legal arbitration target.

The state information can be used to ensure that particular ordering constraints applicable to the particular bus protocol being used are obeyed when the data arbiter logic is deciding which data transfer to grant access to the associated data channel. Hence, for example, the bus protocol may identify a constraint that read data from addresses with the same source identifier must be returned in the same order as the addresses were issued. In such an example, the state information stored by the state logic will provide sufficient information to allow the data arbiter logic to ensure that this constraint is obeyed, and hence enable the data arbiter logic to determine which of the multiple data transfers seeking to use the associated data channel are legal arbitration targets (i.e. are data transfers that could be selected without violating such an ordering constraint). Each data arbiter logic can then apply an arbitration policy to grant access to the associated data channel to one of the data transfers that is a legal arbitration target.

In one embodiment the data arbiter logic grants access to the data channel only to requesting sources. In an alternative embodiment, the data arbiter logic only grants access to the data channel when the source is requesting and the destination is ready to receive the data In one particular embodiment, each read transaction has associated therewith a source identifier identifying the source of the read transaction, the control logic further comprises an address decoder operable for each read transaction to determine from that read transaction's address transfer a target slave logic unit for that read transaction, and the state logic is operable to store state information for each pending read transaction, the state information for each pending read transaction comprising an indication of the source identifier and the target slave logic unit for that pending read transaction.

The source identifier may merely identify a particular master logic unit responsible for initiating the transaction or alternatively/additionally may provide a finer level of granularity of source identification in situations where master devices may have a plurality of possible ID values that they can use when initiating transactions.

The arbitration policy applied by the read data arbiter logic can take a variety of forms. In one embodiment, the arbitration policy is operable to prioritise the data transfers that are legal arbitration targets based on the source identifier and/or the target slave logic unit of the associated read transactions.

For any particular arbitration policy, it is possible to apply many different arbitration schemes to the actual data arbitration, such as fixed priority, round-robin, or latency timer schemes. Hence, by way of example, if the data processing apparatus had three slave devices, S1, S2 and S3, and the arbitration policy prioritised the data transfers based on target slave logic unit, then a fixed priority arbitration scheme could be adopted such that slave logic unit S1 had a higher priority than slave logic unit S2 which in turn had a higher priority than slave logic unit S3. Alternatively a round-robin arbitration scheme could be used such that once the data channel had been allocated to the data transfers of a transaction pertaining to slave logic unit S1, then slave logic unit S2 will be given priority for the next data channel allocation, followed by slave logic unit S3 for the next allocation, followed by slave logic unit S1 again for the next allocation. As another alternative, a latency timer scheme can be used such that once a timer associated with a particular slave logic unit has reached a predetermined value, then the priority of that slave logic unit will be increased.

The interconnect logic can take a variety of forms. In one embodiment, the plurality of connection paths form a single layer interconnect structure, and a single read data arbiter logic is provided for the read data channel. However, in an alternative embodiment, the plurality of connection paths form a multi-layer interconnect structure, and a separate read data arbiter logic is provided for each master logic unit coupled to the read data channel.

In one embodiment, the at least one data channel comprises a write response channel operable to carry, for each write transaction, transaction status information from the slave logic unit to the master logic unit involved in that write transaction. In one particular embodiment, such a write response channel is provided in addition to one or more read data channels for carrying data from slave logic units to master logic units. The same criteria discussed above when describing how the read data arbiter logic arbitrates amongst multiple data transfers seeking to use an associated read data channel can also be applied to the data arbiter logic associated with the write response channel when arbitrating amongst multiple instances of transaction status information to be transferred from slave logic units to master logic units.

In one particular embodiment, each write transaction has associated therewith a master identifier identifying the master logic unit initiating the write transaction; and the state logic is operable to store state information for each pending write transaction, the state information for each pending write transaction comprising at least an indication of the master identifier.

In one embodiment, the control logic further comprises an address decoder operable for each write transaction to determine from that write transaction's address transfer a target slave logic unit for that write transaction, and the state information for each pending write transaction further comprises an indication of the target slave logic unit for that pending write transaction. In one particular embodiment, this additional state information is stored in the state logic for interconnect logic having a single layer interconnect structure.

In one embodiment, the arbitration policy applied by the write data arbiter logic is operable to prioritise the data transfers that are legal arbitration targets based on the master identifier and/or target slave logic unit of the associated write transactions. In particular, for a single layer interconnect structure, one or both aspects may be used for prioritization, whereas for a multi-layer interconnect structure the master identifier may be used but the target slave logic unit will not be used for prioritization.

In one embodiment, each write transaction has associated therewith a source identifier identifying the source of the write transaction, and the arbitration policy is operable to prioritise the data transfers that are legal arbitration targets based on the master identifier and/or the target slave logic unit and/or the source identifier of the associated write transactions. Again, as with the earlier discussion of read transactions, for any particular arbitration policy, a number of different arbitration schemes may be used, such as fixed priority, round-robin or latency timer schemes.

In one embodiment, the plurality of connection paths form a single layer interconnect structure, and a single write data arbiter logic is provided for the write data channel. In an alternative embodiment, the plurality of connection paths form a multi-layer interconnect structure, and a separate write data arbiter logic is provided for each slave logic unit coupled to the write data channel.

Viewed from a second aspect, the present invention provides a data processing apparatus comprising a plurality of master logic units and slave logic units, and interconnect logic in accordance with the first aspect of the present invention for coupling the master logic units and the slave logic units to enable transactions to be performed.

Viewed from a third aspect, the present invention provides interconnect logic for coupling master logic means and slave logic means within a data processing apparatus to enable transactions to be performed, each transaction comprising an address transfer from a master logic means to a slave logic means and one or more data transfers between that master logic means and that slave logic means, the interconnect logic comprising: a plurality of connection path means for providing at least one address channel means for carrying address transfers, at least one read data channel means for carrying data transfers of read transactions from said slave logic means to said master logic means, and at least one write data channel means for carrying data transfers of write transactions from said master logic means to said slave logic means; control means for controlling the use of the at least one address channel means, the at least one read data channel means and the at least one write data channel means in order to enable the transactions to be performed; the control means comprising: address arbiter means for arbitrating, for an associated address channel means, between multiple address transfers seeking to use that associated address channel means; read data arbiter means for arbitrating, for an associated read data channel means, between multiple data transfers seeking to use that associated read data channel means; and write data arbiter means for arbitrating, for an associated write data channel means, between multiple data transfers seeking to use that associated write data channel means; each of the read data arbiter means and the write data arbiter means being operable independently of the address arbiter means such that the one or more data transfers of multiple transactions can occur out of order with respect to the corresponding address transfers of those multiple transactions.

Viewed from a fourth aspect, the present invention provides a method of coupling master logic units and slave logic units within a data processing apparatus to enable transactions to be performed, each transaction comprising an address transfer from a master logic unit to a slave logic unit and one or more data transfers between that master logic unit and that slave logic unit, the method comprising the steps of: (a) employing a plurality of connection paths to provide at least one address channel for carrying address transfers, at least one read data channel for carrying data transfers of read transactions from said slave logic units to said master logic units, and at least one write data channel for carrying data transfers of write transactions from said master logic units to said slave logic units; (b) controlling the use of the at least one address channel, the at least one read data channel and the at least one write data channel in order to enable the transactions to be performed by the steps of: (i) causing address arbiter logic for an associated address channel to arbitrate between multiple address transfers seeking to use that associated address channel; (ii) causing read data arbiter logic for an associated read data channel to arbitrate between multiple data transfers seeking to use that associated read data channel; (iii) causing write data arbiter logic for an associated write data channel to arbitrate between multiple data transfers seeking to use that associated write data channel; and (iv) operating each of the read data arbiter logic and write data arbiter logic independently of the address arbiter logic such that the one or more data transfers of multiple transactions can occur out of order with respect to the corresponding address transfers of those multiple transactions.

DESCRIPTION OF THE DRAWINGS

The technology will be described further, by way of example only, with reference to non-limiting example embodiments as illustrated in the accompanying drawings, in which.

DETAILED DESCRIPTION

The interconnect logic of a data processing apparatus employs a split transaction protocol in which separate address channels and data channels are provided, and the timing of data transfers is decoupled with respect to the timing of address transfers of a particular transaction. In one non-limiting example embodiment, the interconnect logic operates in accordance with the AXI protocol, and the connection paths of the interconnect logic provide five channels, namely a read address channel, a write address channel, a read data channel, a write data channel and a write response channel.

Figure 1:
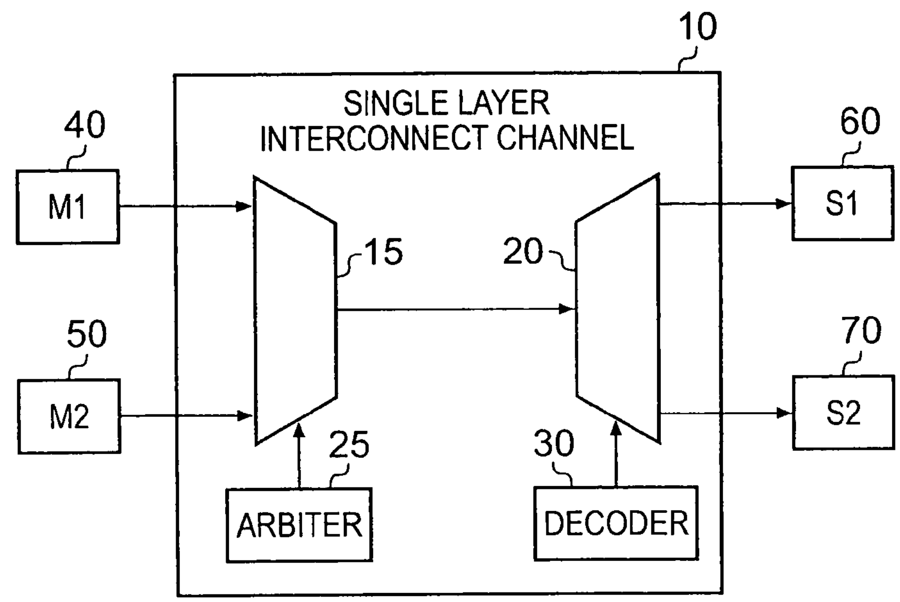
FIG. 1 is a block diagram illustrating a channel of a single layer interconnect structure.

In one non-limiting example embodiment, the interconnect logic has a single layer interconnect structure. FIG. 1 is a block diagram illustrating schematically the read address channel of such a single layer interconnect. In this example, two master logic units 40, 50 and two slave logic units 60, 70 are coupled to the channel 10 of the single layer interconnect. Within the channel 10, an arbiter 25 is used to control a multiplexer 15 so as to arbitrate between multiple read address transfers issued by the master logic units 40, 50. Similarly, a decoder 30 is provided for controlling the de-multiplexer 20 so as to route any particular read address transfer to the appropriate target slave logic unit 60, 70.

The write address channel and the write data channel are constructed in a similar way to the read address channel illustrated in FIG. 1. The read data channel and write response channel are also constructed similarly, but in these two instances the position of the master logic units 40, 50 and slave logic units 60, 70 are reversed, since for these two channels the transfers occur from the slave logic units to the master logic units.

Figure 2:
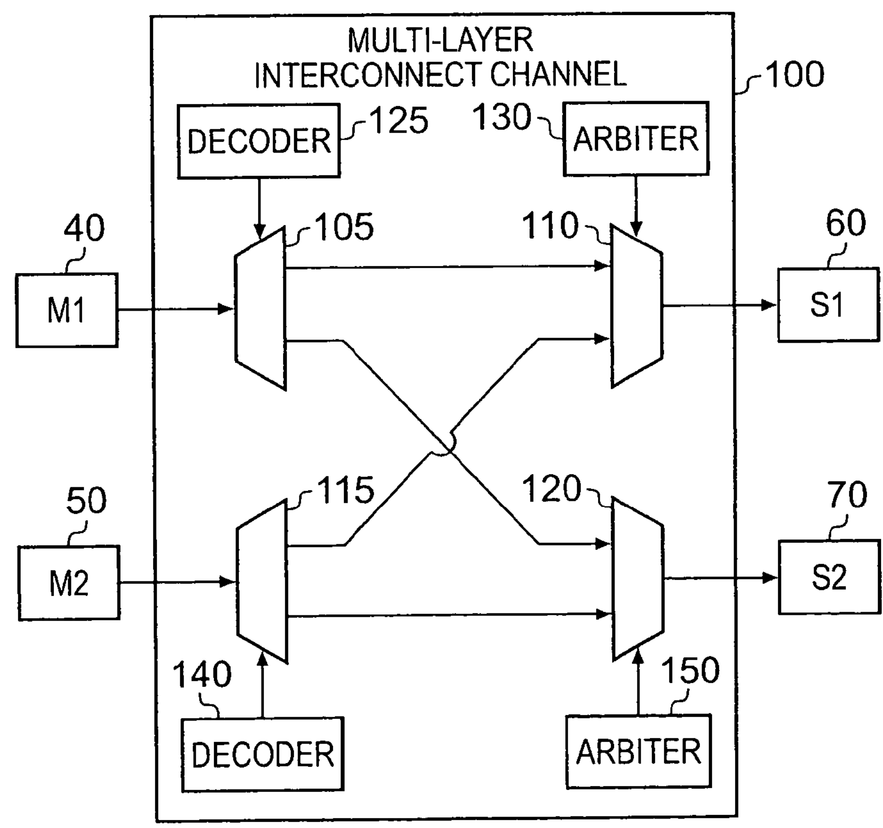
FIG. 2 is a diagram illustrating a channel of a multi-layer interconnect structure.

In an alternative non-limiting example embodiment, the interconnect logic has a multi-layer interconnect structure. FIG. 2 schematically illustrates the components provided within a read address channel of such a multi-layer interconnect structure in accordance with one non-limiting example embodiment. Again, two master logic units 40, 50 and two slave logic units 60, 70 are shown connected to the read address channel 100. Decoders 125, 140 are provided in association with each master logic unit 40, 50, for controlling respective de-multiplexers 105, 115 so as to control the routing of the read address transfers through the channel 100 dependent on the target slave logic unit. Further, arbiters 130, 150 are provided in association with each slave logic unit 60, 70 for controlling respective multiplexers 110, 120 so as to arbitrate between multiple read address transfers destined for a particular slave logic unit. As with the FIG. 1 example, the write address channel and write data channel for a multi-layer interconnect structure will be constructed in a similar manner to that shown for the read address channel 100 of FIG. 2, and the read data channel and write response channel will also be constructed similarly but with the positions of the master logic units 40, 50 and slave logic units 60, 70 reversed.

It will be appreciated that in a typical data processing apparatus, there will often be more than two master logic units and more than two slave logic units, and accordingly there will be a corresponding proliferation of paths and associated logic within each of the channels. Accordingly the diagrams of FIGS. 1 and 2 should be treated as schematic illustrations rather than diagrams of the actual paths provided in any particular embodiment.

Figure 3:
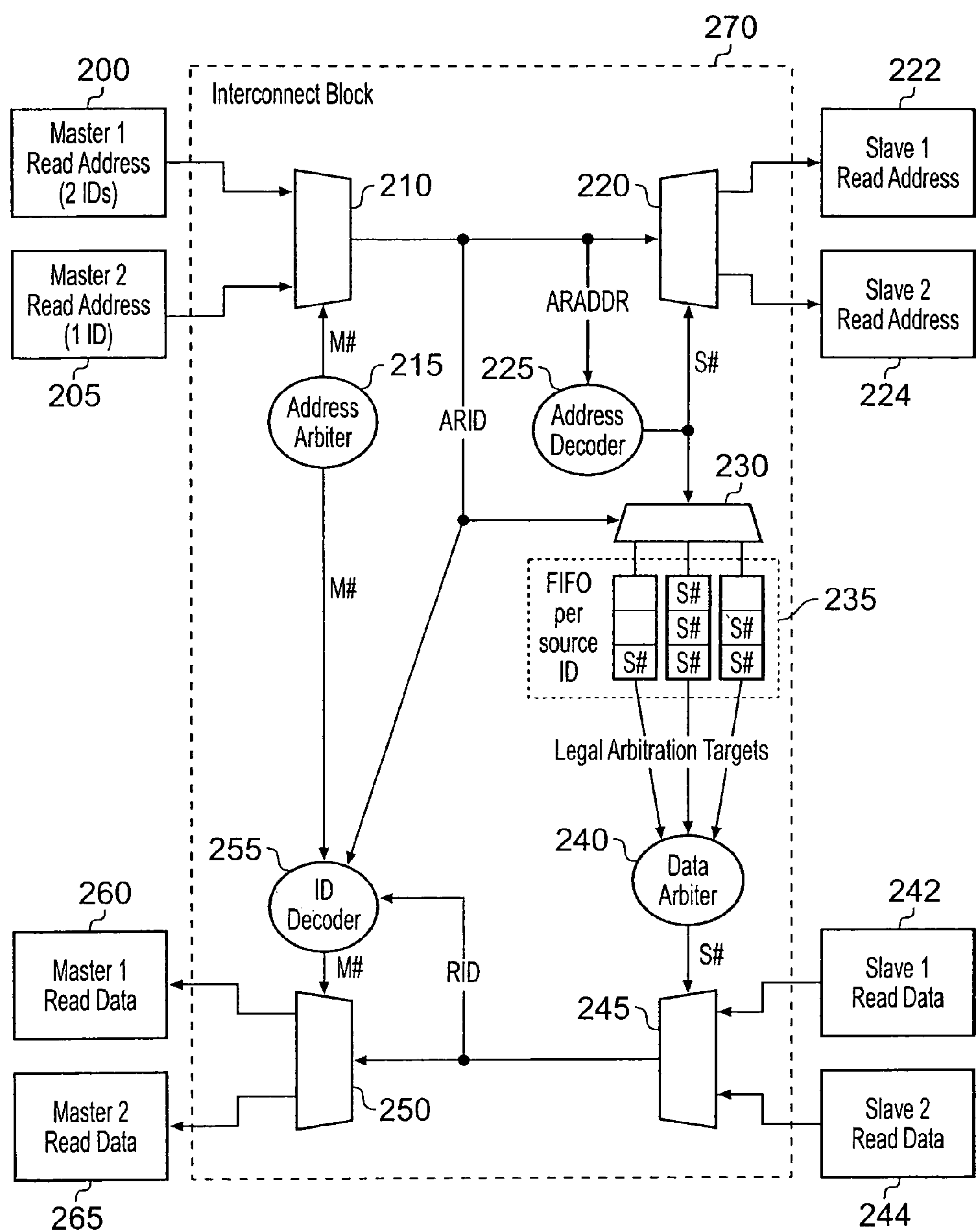
FIG. 3 is a diagram illustrating the components provided within a single layer interconnect structure to enable read data arbitration to be performed in accordance with one non-limiting example embodiment.

FIG. 3 is a diagram illustrating the control logic provided in association with both the read address channel and the read data channel of the interconnect logic in where the interconnect logic has a single layer interconnect structure. Accordingly, the interconnect block 270 illustrates those parts of the interconnect logic used to form the read address channel, the read data channel and the associated control logic. As shown in FIG. 3, a multiplexer 210 is arranged to receive read address transfers 200, 205 from two different master logic units, with address arbiter logic 215 being used to control the multiplexer 210 so as to arbitrate between multiple address transfers seeking to use the address channel.

Each address transfer is routed from the multiplexer 210 to the de-multiplexer 220 which, as discussed earlier with reference to FIG. 1, is controlled by the output from an address decoder 225. In particular, the address decoder 225 is arranged to receive the address contained within the address transfer and to determine therefrom which slave logic unit is the target slave logic unit for the address transfer. The address decoder 225 can then output a slave number to the de-multiplexer 220 to cause the address transfer to be output as either slave 1 read address 222 or slave 2 read address 224 over the appropriate path to the required target slave logic unit.

This slave number information is also input to a de-multiplexer 230 which is controlled dependent on an ID signal within the address transfer. This ID value identifies the source of the address transfer, and as mentioned earlier may merely identify a particular master logic unit if the master logic unit is arranged to only use a single ID value, or alternatively may identify at a finer granularity the actual source of the transaction within a particular master if the master logic unit is arranged to use multiple ID values.

State logic 235 is provided which can conceptually be considered to be arranged as a First-In-First-Out (FIFO) buffer per ID value, within which slave number information is stored. Accordingly, based on the ID value received by the de-multiplexer 230, the de-multiplexer 230 will route the slave number received form the address decoder 225 into the appropriate FIFO of the state logic 235. The slave information will be retained in the state logic 235 until the associated transaction has completed. In practice, the state logic need not be constructed as a plurality of FIFOs, one per ID value, but instead can be implemented as a single, random access storage resource where temporal ordering within an ID is preserved, such that if multiple entries have the same ID value, it can be determined which entry pertains to the earliest address transfer output over the address channel.

Considering now the read data channel, any data transfers output from the slave devices (in the example of FIG. 3 either slave 1 read data 242 or slave 2 read data 244) are received by the multiplexer 245, which is controlled by the data arbiter 240. The data arbiter 240 is arranged to reference the state logic 235 in order to select one of the data transfers for access to the data channel. Firstly, the data arbiter references the state logic 235 in order to determine if there are multiple legal arbitration targets. The AXI protocol specifies a constraint that read data for addresses with the same ID value must be returned in the same order as the addresses were issued, and accordingly at any point in time there can only be one legal arbitration target for a particular ID. However, if multiple of the FIFOs have slave numbers stored therein, then this will present the data arbiter with multiple legal arbitration targets.

Hence, if there is only a single legal arbitration target identified by the state logic 235, then the data arbiter 240 will cause the multiplexer 245 to output the data transfer associated with that legal arbitration target. However, if there are multiple legal arbitration targets, then the data arbiter logic will apply an arbitration policy in order to determine one of the data transfers to be granted access to the data channel. In particular, in one embodiment of the present invention, the data arbiter 240 can prioritise amongst the multiple legal arbitration targets based on master, slave, ID value, or a combination of any of these. Master and slave based arbitration allows peripherals with specific latency or bandwidth requirements to be prioritised over others, helping to facilitate a QoS guarantee. ID value arbitration enables a master to control which of its read steams has priority over another when they are to different slaves. Furthermore, it is possible to apply many different arbitration schemes to the selected arbitration policy, such as fixed priority, round-robin or latency timer schemes.

As a result of applying the arbitration policy, the data arbiter 240 will cause the multiplexer 245 to output one of the input data transfers over the read data channel, and this data transfer will include an ID value identifying the source of the transaction (i.e. which master issued the read transaction), and hence the destination for the data transfer.

The de-multiplexer 250 is arranged to receive the data transfer output by the multiplexer 245, and is controlled by an ID decoder 255 which receives the ID value output in association with the data transfer. Further, as shown in FIG. 3, the ID decoder 255 is arranged to receive from the address channel the master number and associated ID value for each read address issued, which the ID decoder then logs in a lookup table. The ID decoder then uses the ID value received from the read data channel as a lookup value into the table, in order to retrieve the master number for the master device to which the read data is destined. Accordingly, the data transfer is then routed to the appropriate master device as either master 1 read data 260 or master 2 read data 265.

In the above FIG. 3 example, it has been assumed that there are two master logic units, two slave logic units, and three possible ID values. However, it will be appreciated that in other embodiments different numbers of master logic units, slave logic units and ID values could be provided whilst still employing the same data arbitration technique as described with reference to the data arbiter 240 of FIG. 3.

Further, the data arbitration policy described with reference to FIG. 3 applies equally to arbitration performed on any other return path, such as the write response channel provided in accordance with the AXI protocol. In this case, the read data of FIG. 3 will actually comprise transaction status information output by each slave logic unit when a particular write transaction is completed to provide an indication to the relevant master logic unit as to whether that write transaction has completed successfully or not.

Figure 4:
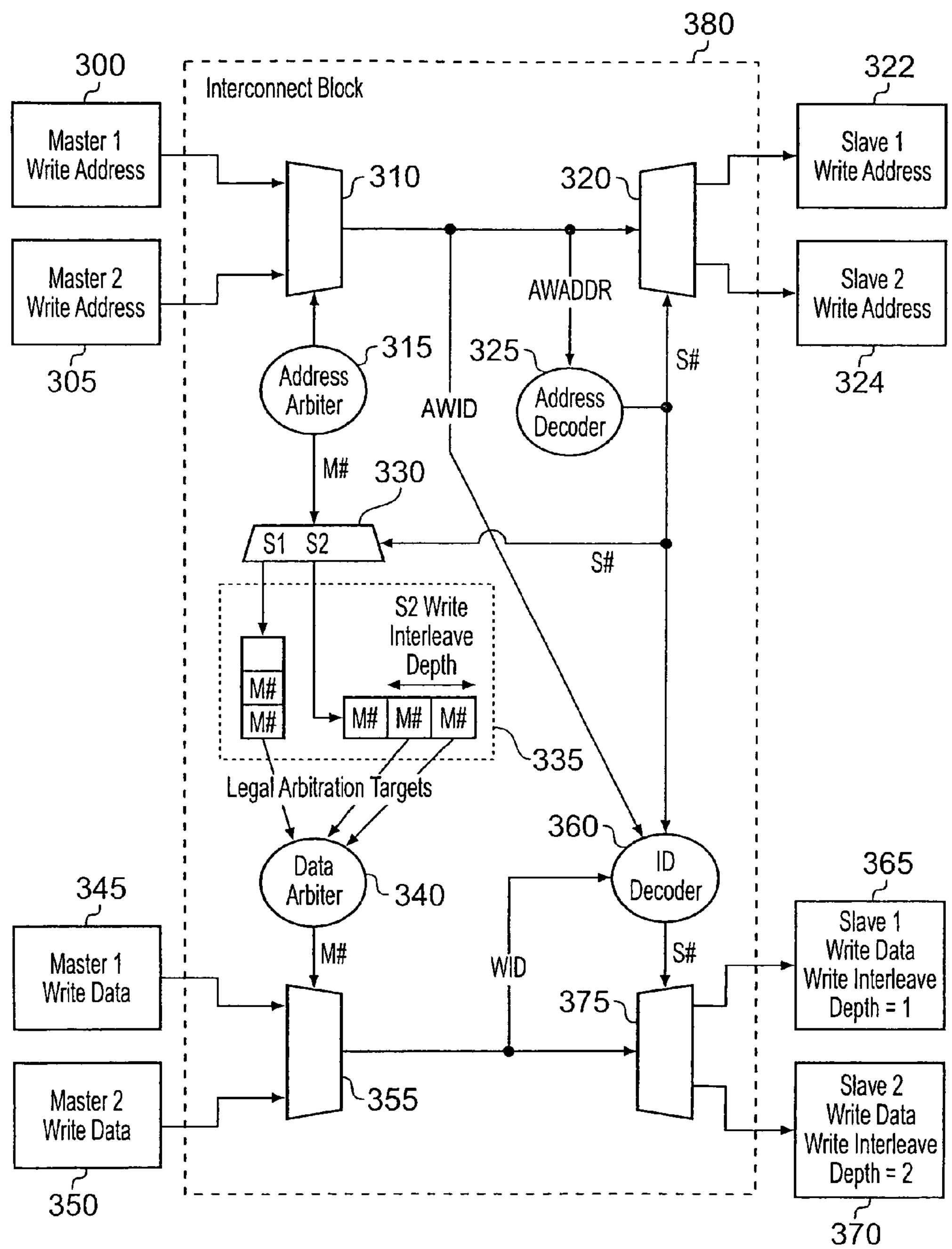
FIG. 4 is a diagram illustrating the components provided within a single layer interconnect structure to enable write data arbitration to be performed in accordance with one non-limiting example embodiment.

FIG. 4 is a block diagram showing the components provided within a single layer interconnect logic in accordance with one non-limiting example embodiment in order to provide arbitration of the write data channel. In a similar way to the read address channel discussed earlier with reference to FIG. 3, the write address channel provided within the interconnect block 380 of FIG. 4 includes a multiplexer 310 controlled by an address arbiter 315, which can receive master 1 write address transfers 300 and master 2 write address transfers 305. Each address transfer output onto the address channel is routed to a de-multiplexer 320, which is controlled by an address decoder 325 arranged to determine from the address the target slave logic unit for the write transaction, and to output a slave number indicating that target slave logic unit. The slave number controls the de-multiplexer 320 to cause the write address transfer to be routed as either slave 1 write address 322 or slave 2 write address 324 to the required slave logic unit, and in addition the slave number is routed to the ID decoder 360 and to the de-multiplexer 330.

The address arbiter 315 is further arranged to issue to the de-multiplexer 330 an indication of the master logic unit that has been granted access to the write address channel, this indication taking the form of a master number.

State logic 335 is provided for storing state information accessible to the data arbiter logic 340 of the write data channel when performing arbitration with respect to that data channel. In particular the state logic 335 can conceptually be considered to comprise a storage per slave number, and the de-multiplexer 330 is arranged based on the slave number received from the address decoder 325 to output the master number received from the address arbiter 315 into the storage associated with that slave number.

Slave devices may have different capabilities with regards to the ordering of write data that they receive, and this is specified by a write interleave depth value associated with each slave device. In the example given, it is assumed that slave device 1 has a write interleave depth of 1, meaning that that slave device can only accept write data transfers in the same order as the associated write address transfers. Hence, the storage within the state logic 335 that is associated with slave device 1 can be considered to operate as a FIFO with respect to the master numbers stored therein.

However, slave device 2 has a write interleave depth of 2, meaning that for two write data transfers the slave device can accept the data out of order with respect to the associated two write address transfers. Hence, the storage within the state logic 335 that is associated with slave device 2 can be considered to act as a FIFO-style queue, but with the output being provided by one of the two entries at the head of the queue.

Considering now the write data channel, the multiplexer 355 is arranged to receive both master 1 write data transfers 345 and master 2 write data transfers 350. As with the earlier discussion of the read data arbiter 240 in FIG. 3, the write data arbiter 340 of FIG. 4 will reference the state logic 335 in order to determine if there are multiple legal arbitration targets.

Given the write interleave depth of 1 associated with slave device 1, the storage of the state logic 335 associated with slave device 1 can only identify up to one legal arbitration target at any time. However, given the write interleave depth of 2 associated with slave device 2, the storage of the state logic 335 associated with slave device 2 can identify up to two legal arbitration targets at any time. Clearly, if both of the two entries at the head of that storage associated with slave device 2 contain the same master number, then the two legal arbitration targets identified are the same.

If there is only a single legal arbitration target, then the data arbiter 340 will control the multiplexer 355 to output the appropriate data transfer onto the write data channel. However, in the presence of multiple legal arbitration targets, the data arbiter will apply an arbitration policy to determine one of the write data transfers to be granted access to the write data channel. The arbitration policy applied can take a variety of forms. However, in one embodiment, the data arbiter 340 can prioritise based on master or slave number, or a combination of both. Additionally, if the write data ID (WID) is routed to the data arbiter 340, the data arbiter 340 can also be arranged to prioritise based on source ID.

As a result of the arbitration performed by the write data arbiter 340 one of the write data transfers will be output onto the write data channel, and will be received by the de-multiplexer 375. The de-multiplexer is controlled by the output from the ID decoder 360, which receives as a control signal the ID value output on the write data channel identifying the source of the write transaction. As shown in FIG. 4, the ID decoder 360 is arranged to receive from the address channel the slave number and associated ID value for each write address issued, which the ID decoder then logs in a lookup table. The ID decoder 360 then uses the ID value received from the write data channel as a lookup value into the table, in order to retrieve the slave number for the slave device to which the write data is destined. This slave number is then output to the de-multiplexer 375 to cause the write data transfer to be routed to the appropriate slave logic unit as either slave 1 write data 365 or slave 2 write data 370.

As with FIG. 3, the example of FIG. 4 assumes two master logic units and two slave logic units, but again in different embodiments different numbers of master logic units and slave logic units can be used whilst still enabling the same data arbitration principles described with reference to the write data arbiter 340 to be employed.

Figure 5:
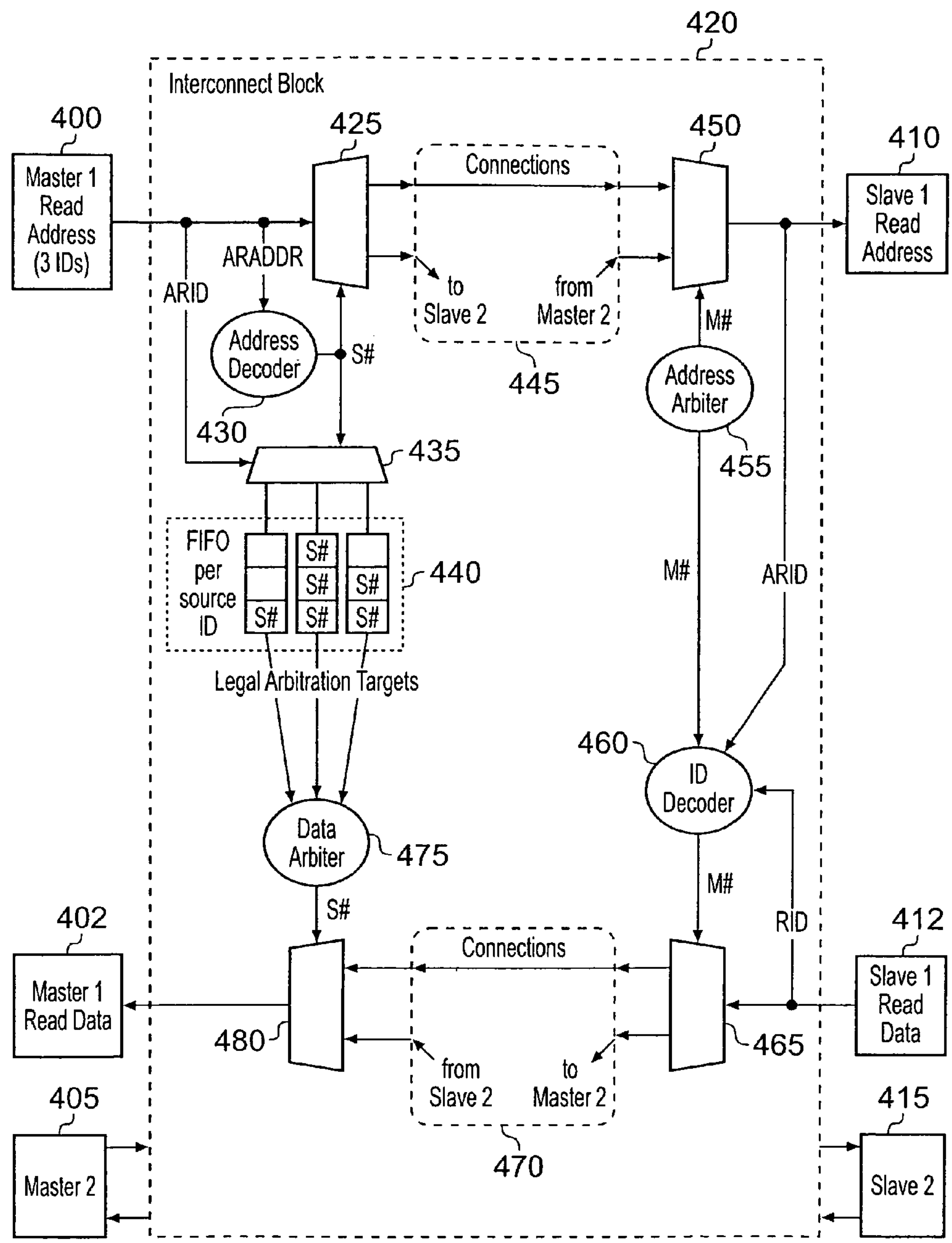
FIG. 5 is a diagram illustrating the components provided within a multi-layer interconnect structure to enable read data arbitration to be performed in accordance with one non-limiting example embodiment.

FIG. 5 is a block diagram schematically illustrating the control logic provided in association with the read address channel and the read data channel of a multi-layer interconnect in accordance with one non-limiting example embodiment. For the purpose of this example, it is assumed that there are two master logic units, two slave logic units, and three possible ID values. However, it will be appreciated that in alternative embodiments, different numbers of master logic units, slave logic units and ID values could be used. Furthermore, FIG. 5 only illustrates the detail of the control logic provided in association with the first master logic unit and the first slave logic unit. Similar logic will also be provided in association with the second master logic unit 405 and the second slave logic unit 415.

Considering a read address transfer 400 issued by the first master device this read address transfer will be received by the de-multiplexer 425 which is controlled by the address decoder 430 to cause the read address to be transferred via the connection paths 445 to either the first slave device as slave 1 read address 410 or the second slave device 415. The address decoder will determine from the read address the slave number, and will use that slave number to control the de-multiplexer 425. This slave number will also be input to the de-multiplexer 435, which is controlled dependent on the ID value associated with the read address transfer. As with the earlier discussion of FIG. 3, this will cause the slave number to be stored in the relevant FIFO of the state logic 440, which provides conceptually a FIFO per ID value.

The first slave device has a multiplexer 450 associated therewith within the interconnect block 420, which receives read address transfers from both the first master device and the second master device 405. The address arbiter 455 then arbitrates between multiple address transfers seeking to be issued to the first slave device, and controls the multiplexer 450 dependent on that arbitration.

Considering now the read data channel, read data 412 output from the first slave device will be received by a corresponding de-multiplexer 465 which is controlled by an ID decoder 460 which receives the ID value associated with that data transfer. The ID decoder 460 operates in an analogous manner to the ID decoder 255 of FIG. 3, in that the ID value is used as an index into a lookup table maintained by the ID decoder in order to identify the master number specifying the master device to which the read data is destined. Hence, dependent on the ID value, the data decoder 460 will cause the data transfer to be output via the data connection paths 470 to either the first master device or the second master device 405.

In association with the first master device, a multiplexer 480 will be provided for receiving data transfers from either the first slave device or the second slave device 415, and this multiplexer 480 is controlled by the data arbiter 475. The data arbiter 475 operates in an analogous manner to the data arbiter 240 of FIG. 3. However, since there will be a separate data arbiter 475 for each master logic unit, the data arbiter 475 will prioritise amongst multiple legal arbitration targets based on either slave or ID value, or a combination of both, but will not use master identifiers in any such arbitration. As a result of the data arbitration performed, data will be selected for outputting to master device 1 as read data 402.

Figure 6:
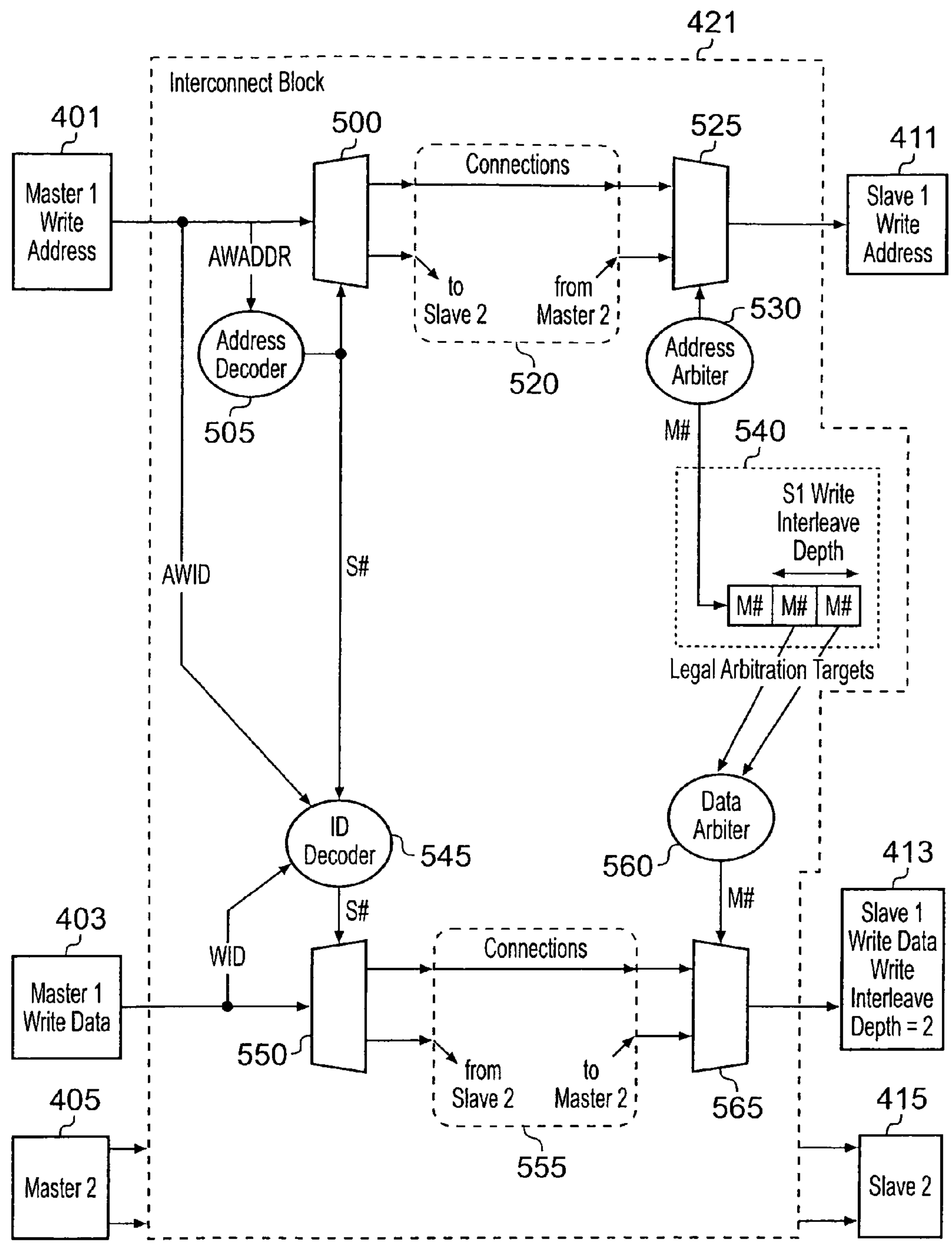
FIG. 6 is a diagram illustrating the components provided within a multi-layer interconnect structure to enable write data arbitration to be performed in accordance with one non-limiting example embodiment.

FIG. 6 is a block diagram illustrating logic provided within a multi-layer interconnect in accordance with one non-limiting example embodiment to provide control logic for both the write address channel and the write data channel. As with FIG. 5, FIG. 6 assumes that there are two master logic units and two slave logic units, but again in different embodiments different numbers of master logic units and slave logic units could be used. Furthermore, as with FIG. 5, FIG. 6 illustrates only the control logic provided in a association with a first master logic unit and a first slave logic unit, and similar logic will also be provided in association with the second master logic unit 405 and the second slave logic unit 415.

When the first master logic unit outputs a write address transfer 401, this will be received by the de-multiplexer 500 of the interconnect block 421, which is controlled by the address decoder 505. The address decoder 505 determines from the address of the write address transfer the destination slave number, and controls the de-multiplexer 500 accordingly to ensure that the write address transfer is routed via connection paths 520 to either slave logic unit 1 or slave logic unit 2 415 as appropriate. The slave number is also routed as an input to the ID decoder 545 which also receives the ID value from the write address channel and logs both values.

The multiplexer 525 associated with the first slave logic unit receives write address transfers from both the first master logic unit and the second master logic unit 405, and outputs a slave 1 write address 411. The address arbiter 530 is arranged to arbitrate amongst multiple write address transfers seeking to access the first slave logic unit, and to control multiplexer 525 accordingly. The address arbiter 530 also outputs a master number to the de-multiplexer 535 dependent on the arbitration it performs, and the de-multiplexer 535 is controlled dependent on the ID value output from the multiplexer 525 to cause the master number to be stored in a storage of the state logic 540.

Considering now the write data channel, the ID decoder 545 operates in an analogous manner to the ID decoder 360 discussed earlier with reference to FIG. 4, and accordingly causes the write data transfer 403 received by the de-multiplexer 550 to be routed via the write data connections 555 to either the first slave logic unit or the second slave logic unit 415 as appropriate.

Similarly, the write data arbiter 560 and multiplexer 565 operate in an analogous manner to the write data arbiter 340 and multiplexer 355 discussed earlier with reference to FIG. 4, such that the data arbiter 560 can arbitrate between multiple write data transfers destined for the first slave logic unit, to cause the multiplexer 565 to output slave 1 write data 413. It should be noted that the data arbiter 560 can only be provided with multiple legal arbitration targets due to the fact that slave device 1 has a write interleave depth greater than 1:

Whereas the data arbiter 340 of FIG. 4 could conceptually prioritise based on master or slave (or ID value if the ID value is routed to the data arbiter), in the FIG. 6 example the write data arbiter 560 is associated with a particular slave logic unit, and hence in this case the arbitration policy applied by the write data arbiter 560 can prioritise based on the master (or ID value if the ID value is routed to the data arbiter), but will not use any slave identification information in the prioritisation.

It will be appreciated that in the above described example embodiments, the arbitration policies and arbitration schemes applied by the data arbiters could be configured statically, or could be arranged to be dynamically programmable at run time.

The above-described data arbitration techniques are useful in providing QoS guarantees at a system level. As described earlier, this is becoming a key requirement of System on Chip (SoC) designs that have peripheral devices with specific latency and bandwidth requirements. Applying effective QoS guarantees also enables more efficient use to be made of the interconnect resources, which reduces the power and layout overhead of the interconnect logic.

Examples of where the data arbitration techniques of embodiments of the present invention may be useful include, for example, prioritising read data from a Dynamic Memory Controller (DMC) over that from other peripherals (i.e. prioritisation based on slave identifiers), prioritising data destined for an LCD controller in order to meet the maximum latency requirements of the LCD controller (i.e. prioritisation based on master identifiers), prioritising data originating from a cache miss over data associated with an instruction pre-fetch (i.e. prioritisation based on ID value), etc.

The technique described is relatively simple to implement, because the information used to make arbitration decisions based on master, slave or ID value is already present within the interconnect logic in order to satisfy the ordering constraints of the split transaction protocol, for example the AXI protocol in the particular embodiments described.

Although particular example embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. Interconnect logic for coupling master logic units and slave logic units within a data processing apparatus to enable transactions to be performed, each transaction comprising an address transfer from a master logic unit to a slave logic unit and one or more data transfers between that master logic unit and that slave logic unit, the interconnect logic employing a split transaction protocol having at least one ordering constraint, comprising:

a plurality of connection paths operable to provide at least one address channel for carrying address transfers, at least one read data channel for carrying data transfers of read transactions from said slave logic units to said master logic units, and at least one write data channel for carrying data transfers of write transactions from said master logic units to said slave logic units; and control logic operable to control the use of the at least one address channel, the at least one read data channel and the at least one write data channel in order to enable the transactions to be performed;

the control logic comprising:

address arbiter logic operable for an associated address channel to arbitrate between multiple address transfers seeking to use that associated address channel;

read data arbiter logic operable for an associated read data channel to arbitrate between multiple data transfers seeking to use that associated read data channel; and write data arbiter logic operable for an associated write data channel to arbitrate between multiple data transfers seeking to use that associated write data channel;

each of the read data arbiter logic and write data arbiter logic being operable independently of the address arbiter logic such that the one or more data transfers of multiple transactions can occur out of order with respect to the corresponding address transfers of those multiple transactions, wherein the control logic further comprises:

state logic operable to store state information, the state information being derived from the address transfers and providing information used to determine, for each data transfer, whether granting that data transfer access to the associated data channel would violate the at least one ordering constraint;

each of the read data arbiter logic and write data arbiter logic being independently operable to reference the state information in order to determine which of the multiple data transfers seeking to use the associated data channel are legal arbitration targets, the legal arbitration targets being those data transfers from among the multiple data transfers that will not violate the at least one ordering constraint if granted access to the associated data channel;

each of the read data arbiter logic and write data arbiter logic being independently operable in the presence of multiple legal arbitration targets to apply an arbitration policy to grant access to the associated data channel to one of the data transfers that is a legal arbitration target.

2. Interconnect logic as claimed in claim 1, wherein:

each read transaction has associated therewith a source identifier identifying the source of the read transaction;

the control logic further comprises an address decoder operable for each read transaction to determine from that read transaction's address transfer a target slave logic unit for that read transaction; and the state logic is operable to store state information for each pending read transaction, the state information for each pending read transaction comprising an indication of the source identifier and the target slave logic unit for that pending read transaction.

3. Interconnect logic as claimed in claim 2, wherein the arbitration policy applied by the read data arbiter logic is operable to prioritise the data transfers that are legal arbitration targets based on the source identifier and/or the target slave logic unit of the associated read transactions.

4. Interconnect logic as claimed in claim 1, wherein:

each write transaction has associated therewith a master identifier identifying the master logic unit initiating the write transaction; and the state logic is operable to store state information for each pending write transaction, the state information for each pending write transaction comprising at least an indication of the master identifier.

5. Interconnect logic as claimed in claim 4, wherein:

the control logic further comprises an address decoder operable for each write transaction to determine from that write transaction's address transfer a target slave logic unit for that write transaction; and the state information for each pending write transaction further comprises an indication of the target slave logic unit for that pending write transaction.

6. Interconnect logic as claimed in claim 5, wherein the arbitration policy applied by the write data arbiter logic is operable to prioritise the data transfers that are legal arbitration targets based on the master identifier and/or target slave logic unit of the associated write transactions.

7. Interconnect logic a claimed in claim 6, wherein each write transaction has associated therewith a source identifier identifying the source of the write transaction, and the arbitration policy applied by the write data arbiter logic is operable to prioritise the data transfers that are legal arbitration targets based on the master identifier and/or the target slave logic unit and/or the source identifier of the associated write transactions.

8. Interconnect logic as claimed in claim 1, wherein the plurality of connection paths form a single layer interconnect structure, and a single read data arbiter logic is provided for the read data channel.

9. Interconnect logic as claimed in claim 8, wherein a single write data arbiter logic is provided for the write data channel.

10. Interconnect logic as claimed in claim 1, wherein the plurality of connection paths form a multi-layer interconnect structure, and a separate read data arbiter logic is provided for each master logic unit coupled to the read data channel.

11. Interconnect logic as claimed in claim 10, wherein a separate write data arbiter logic is provided for each slave logic unit coupled to the write data channel.

12. Interconnect logic as claimed in claim 1, further comprising a write response channel operable to carry, for each write transaction, transaction status information from the slave logic unit to the master logic unit involved in that write transaction.

13. A data processing apparatus comprising:

a plurality of master logic units and slave logic units; and interconnect logic as claimed in claim 1 for coupling the master logic units and the slave logic units to enable transactions to be performed.

14. Interconnect logic for coupling master logic means and slave logic means within a data processing apparatus to enable transactions to be performed, each transaction comprising an address transfer from a master logic means to a slave logic means and one or more data transfers between that master logic means and that slave logic means, the interconnect logic employing a split transaction protocol having at least one ordering constraint, comprising:

a plurality of connection path means for providing at least one address channel means for carrying address transfers, at least one read data channel means for carrying data transfers of read transactions from said slave logic means to said master logic means, and at least one write data channel means for carrying data transfers of write transactions from said master logic means to said slave logic means;

control means for controlling the use of the at least one address channel means, the at least one read data channel means and the at least one write data channel means in order to enable the transactions to be performed;

the control means comprising:

address arbiter means for arbitrating, for an associated address channel means, between multiple address transfers seeking to use that associated address channel means;

read data arbiter means for arbitrating, for an associated read data channel means, between multiple data transfers seeking to use that associated read data channel means; and write data arbiter means for arbitrating, for an associated write data channel means, between multiple data transfers seeking to use that associated write data channel means;

each of the read data arbiter means and the write data arbiter means being operable independently of the address arbiter means such that the one or more data transfers of multiple transactions can occur out of order with respect to the corresponding address transfers of those multiple transactions;

wherein the control means further comprises:

state means for storing state information, the state information being derived from the address transfers and providing information used to determine, for each data transfer, whether granting that data transfer access to the associated data channel means would violate the at least one ordering constraint;

each of the read data arbiter means and write data arbiter means being independently operable to reference the state information in order to determine which of the multiple data transfers seeking to use the associated data channel are legal arbitration targets, the legal arbitration targets being those data transfers from among the multiple data transfers that will not violate the at least one ordering constraint if granted access to the associated data channel means;

each of the read data arbiter means and write data arbiter means being independently operable in the presence of multiple legal arbitration targets to apply an arbitration policy to grant access to the associated data channel means to one of the data transfers that is a legal arbitration target.

15. A method of coupling master logic units via interconnect logic and slave logic units within a data processing apparatus to enable transactions to be performed, each transaction comprising an address transfer from a master logic unit to a slave logic unit and one or more data transfers between that master logic unit and that slave logic unit, the interconnect logic employing a split transaction protocol having at least one ordering constraint, the method comprising the steps of:

(a) employing a plurality of connection paths to provide at least one address channel for carrying address transfers, at least one read data channel for carrying data transfers of read transactions from said slave logic units to said master logic units, and at least one write data channel for carrying data transfers of write transactions from said master logic units to said slave logic units;

(b) controlling the use of the at least one address channel, the at least one read data channel and the at least one write data channel in order to enable the transactions to be performed by the steps of:

(i) causing address arbiter logic for an associated address channel to arbitrate between multiple address transfers seeking to use that associated address channel;

(ii) causing read data arbiter logic for an associated read data channel to arbitrate between multiple data transfers seeking to use that associated read data channel;

(iii) causing write data arbiter logic for an associated write data channel to arbitrate between multiple data transfers seeking to use that associated write data channel;

(iv) operating each of the read data arbiter logic and write data arbiter logic independently of the address arbiter logic such that the one or more data transfers of multiple transactions can occur out of order with respect to the corresponding address transfers of those multiple transactions; and (v) storing state information, the state information being derived from the address transfers and providing information used to determine, for each data transfer, whether granting that data transfer access to the associated data channel would violate the at least one ordering constraint;

(vi) causing each of the read data arbiter logic and write data arbiter logic to independently reference the state information in order to determine which of the multiple data transfers seeking to use the associated data channel are legal arbitration targets, the legal arbitration targets being those data transfers from among the multiple data transfers that will not violate the at least one ordering constraint if granted access to the associated data channel;

(vii) causing each of the read data arbiter logic and write data arbiter logic, in the presence of multiple legal arbitration targets, to independently apply an arbitration policy to grant access to the associated data channel to one of the data transfers that is a legal arbitration target.

* * * * *